United States Patent [19]

Nickl

[11] Patent Number: 4,652,732

[45] Date of Patent: Mar. 24, 1987

[54] LOW-PROFILE BAR CODE SCANNER

[75] Inventor: Franklyn G. Nickl, San Jose, Calif.

[73] Assignee: National Semiconductor Corporation, Santa Clara, Calif.

[21] Appl. No.: 776,828

[22] Filed: Sep. 17, 1985

[51] Int. Cl.⁴ .............................................. G06K 7/10
[52] U.S. Cl. ................................... 235/462; 235/383; 235/467; 235/470
[58] Field of Search ................ 235/462, 467, 470, 383

[56] References Cited

U.S. PATENT DOCUMENTS

| | | | |
|---|---|---|---|
| 4,028,537 | 6/1977 | Snow | 235/383 |
| 4,064,390 | 12/1977 | Hildebrand et al. | 235/470 |
| 4,093,865 | 6/1978 | Nickl | 250/566 |
| 4,097,729 | 6/1978 | Seligman et al. | 235/467 |
| 4,124,797 | 11/1978 | Himmel | 235/467 |
| 4,251,798 | 2/1981 | Swartz et al. | |
| 4,346,292 | 8/1982 | Routt, Jr. et al. | 250/216 |
| 4,360,798 | 11/1982 | Swartz et al. | |
| 4,369,361 | 1/1983 | Swartz et al. | 235/470 |
| 4,373,719 | 2/1983 | Nelson et al. | 273/1 E |
| 4,387,297 | 6/1983 | Swartz et al. | 235/462 |
| 4,409,470 | 10/1983 | Shepard et al. | 235/472 |

Primary Examiner—Harold I. Pitts
Attorney, Agent, or Firm—Gail W. Woodward

[57] ABSTRACT

An apparatus for scanning a bar code affixed to an object and providing an electrical signal indicative of the scanned bar code. The apparatus includes a housing having a base portion and a window portion with the window portion being mounted above a rear section of the base portion. A forward section of the base portion has a flat top surface while the window portion has an optically transmissive window mounted in a side facing the top surface. The region above the top surface and adjacent the window defines a scanning region. Means are mounted within the housing for generating first, second and third scan patterns each comprised of a plurality of substantially parallel spaced apart light scan lines. The first scan pattern scan lines each enter the scanning region through the window at planes each at a predetermined angle from planes parallel to the top surface. The third scan pattern scan lines each enter the scanning region through the window at planes each at a second predetermined angle from planes parallel to the top surface. The second scan pattern scan lines each enter the scanning region through the window at planes each substantially perpendicular to the plane of the top surface. The second scan pattern scan lines are oriented along the window for entering the scanning region between the first and second scan pattern scan lines. Means are including for detecting light reflected from the bar code affixed to an object being scanned within the scanning region back through the window. The means for detecting light detects the reflected light having at least a predetermined intensity and provides an electrical signal in response thereto. Means are included for directing the reflective light from a bar code affixed to an object within the scanning region to the means for detecting light.

12 Claims, 6 Drawing Figures

LOW-PROFILE BAR CODE SCANNER

BACKGROUND OF THE INVENTION

I. Technical Field

The present invention relates to a novel and improved apparatus for scanning bar code indicia used on packages to identify products. More specifically, the present invention relates to a compact, low-profile bar code scanner utilizing a novel side scanning technique.

II. Background Art

Systems have previously been developed to scan the conventional bar code coded indicia, commonly referred to as UPC indicia. Such systems have previously fallen into two separate categories, handheld systems or the conventional top or bottom scanning systems. Both systems are commonly used in check-out stations in supermarkets and other retail stores where the UPC symbols encoded onto the package are scanned. The UPC coded information detected from the product is then fed to a computer which generates the price to be charged the customer for the item.

In many applications the portable handheld scanner is rather a disadvantageous tool for reading the UPC code. In applications such as supermarkets, the handheld unit would require the supermarket personnel to locate the UPC code by moving the product with one hand while holding the scanner head in the other. Such use of a handheld scanner is cumbersome for the operator in the supermarket application.

The more typical scanners employed in the supermarkets are the bottom scanning units which require the operator to draw the UPC coded product across the scanner window typically located in the check-out countertop. Several disadvantages accompany the bottom scanning systems with one such disadvantage being the problem with the window getting scratched or dirty. Supermarket personnel must periodically clean from the window spilled liquids or debris from dropped merchandise. In many cases, window replacement is required and can be an expensive procedure in those systems that use sapphire coated glass windows. Another disadvantage with the bottom scanning units, is that the scanning hardware and electronics are typically located in the area beneath the window. Therefore, the space in the counter area beneath the scanner window most be reserved for the scanner hardware. In applications where the clerk desires to sit down there would be no room for the clerks legs beneath the scanning window. Such positioning of the clerk would cause discomfort for the clerk in attempting to operate the scanner by sitting at the side of the scanner.

It is therefore an object of the present invention to provide a new and improved compact, low-profile side scanning bar code scanner.

It is another object of the present invention to provide a bar code scanner which permits access beneath the countertop where the scanner is located.

It is a further object of the present invention to provide a bar code scanner which substantially reduces scanner window maintenance and replacement.

It is yet another object of the present invention to provide a bar code scanner with reduced adjustment requirements of scanner mirrors.

It is still a further object of the present invention to provide a bar code scanner which permits continuous laser operation without reduced eye safety considerations.

SUMMARY OF THE INVENTION

The presnt invention is an apparatus for scanning a bar code affixed to an object and providing an electrical signal indicative of the scanned bar code. The apparatus includes a housing having a base portion and a window portion with the window portion being mounted above a rear section of the base portion. A forward section of the base portion has a flat top surface while the window portion has an optically transmissive window mounted in a side facing the top surface. The region above the top surface and adjacent the window defines a scanning region. Means are mounted within the housing for generating first, second and third scan patterns each comprised of a plurality of substantially parallel spaced apart light scan lines. The first scan pattern scan lines each enter the scanning region through the window at planes each at a predetermined angle from planes parallel to the top surface. The third scan pattern scan lines each enter the scanning region through the window at planes each at a second predetermined angle from planes parallel to the top surface. The second scan pattern scan lines each enter the scanning region through the window at planes each substantially perpendicular to the plane of the top surface. The second span pattern scan lines are oriented along the window for entering the scanning region between the first and second scan pattern scan lines. Means are included for detecting light reflected from the bar code affixed to an object being scanned within the scanning region back through the window. The means for detecting light detects the reflected light having at least a predetermined intensity and provides an electrical signal in response thereto. Means are included for directing the reflective light from a bar code affixed to an object within the scanning region to the means for detecting light.

BRIEF DESCRIPTION OF THE DRAWINGS

These and other features, objects and advantages of the present invention will be more fully apparent from the detailed description set forth below when taken in conjunction with the drawings in which like reference characters identify correspondingly throughout and wherein.

DETAILED DESCRIPTION OF THE PREFERRED EMBODIMENTS

Figure 1:
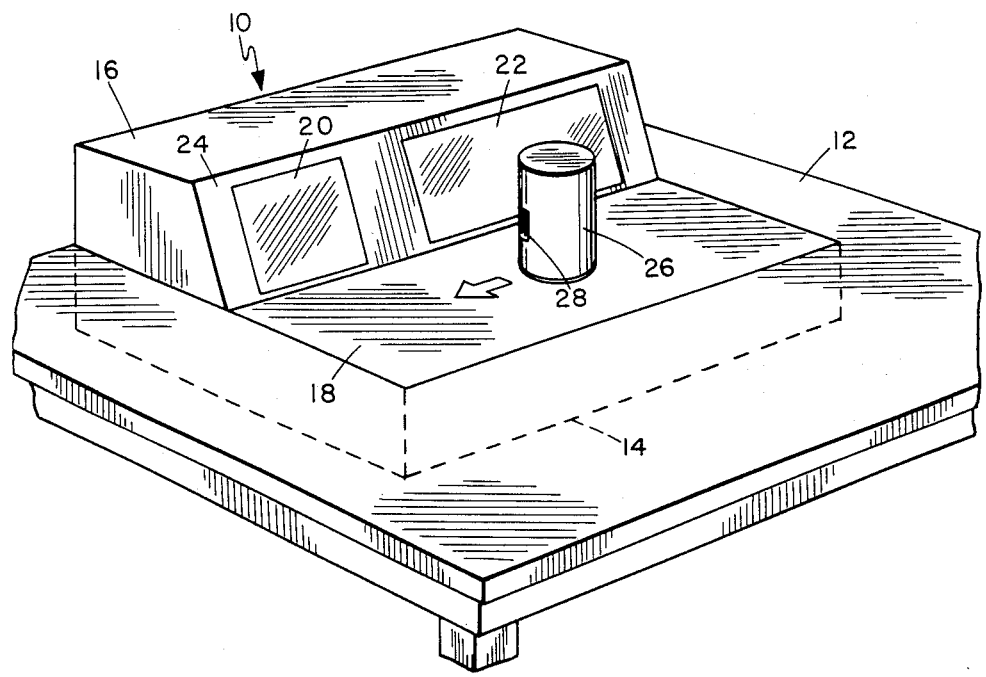
FIG. 1 illustrates the bar code scanner of the present invention inset in a countertop.

Referring to FIG. 1, there is shown the bar code scanner 10 mounted in countertop 12. Scanner 10 includes a housing comprised of base portion 14 and window portion 16. Window portion 16 extends above a rear section of base portion 14 so as to create top surface 18 above a forward section of base portion 14. Top surface 18 is mounted horizontal and flush with the countertop 12. Window portion 16 includes a pair of window sections 20 and 22 mounted in side 24 of window portion 16. Window sections 20 and 22 are positioned in side 24 adjacent and facing the plane perpendicular, or at an angle thereto, to top surface 18.

As goods, for example can 26 bearing a UPC code label 28 on the side, is moved along countertop 12 and top surface 18 in the direction indicated by the arrow, scanner 10 scans can 26 for the label 28. Scan pattern lines emanate from window sections 20 and 22 in predetermined patterns for locating and detecting the code indicated on label 28.

Figure 2:
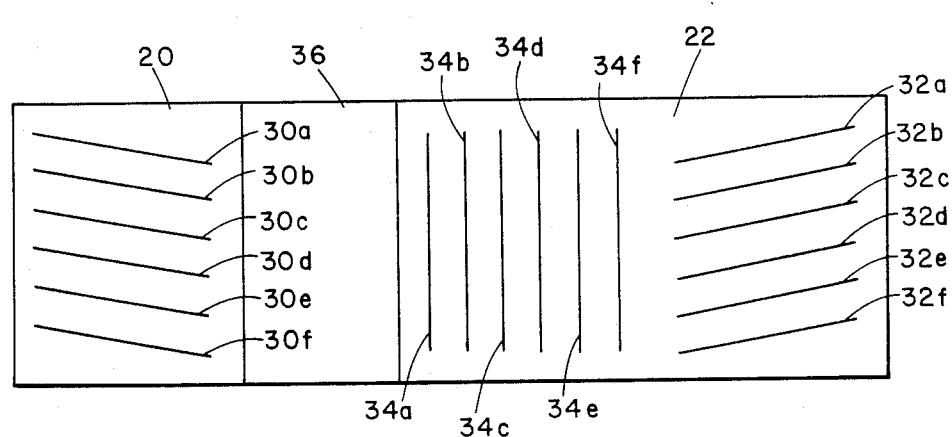
FIG. 2 represents the laser beam scanning pattern which occurs at the scanning windows.

FIG. 2 illustrates the scan pattern generated by the scanner of the present invention. At window section 20 there is scan pattern 30 comprised of six substantially parallel scan lines $30a-30f$. Scan lines $30a-30f$ emanate from window 20 at a predetermined angle from planes parallel to top surface 18. In this example, scan lines $30a-30f$ are angled at a downward tilt from the end opposite window section 22 as approaching window section 22.

Emanating from the scanner unit 10 from window section 22 are scan patterns 32 and 34. Both scan patterns 32 and 34 are each respectively comprised of six substantially parallel scan lines $32a-32f$ and $34a-34f$. Scan lines $32a-32f$ emanate from window section 22 at an end opposite window section 20. Scan lines $34a-34f$ are located adjacent scan lines $32a-32f$ and emanate from window section 22 at an end adjacent divider strip 36, which is positioned between window sections 20 and 22. Divider strip 36 may be either a separate panel in window portion side 24 or it may be a section masked on a single sheet of transparent material so as to form window sections 20 and 22. Divider strip 36 prevents light from entering window portion 16 while permitting window sections 20 and 22 to be defined from a plastic piece of transparent material such as glass or plastic.

Scan lines $32a-32f$ are located symmetrically about a common center line in the material forming window sections 20, divider strip 36 and window section 22. Scan lines $32a-32f$ are substantially parallel scan lines which angled downwardly from ends opposite scan lines $34a-34f$ towards scan lines $34a-34f$.

Scan pattern 34 is comprised of scan lines $34a-34f$ and emanate from scanner 10 through window section 22 in planes which are substantially perpendicular to top surface 18.

Figure 3:
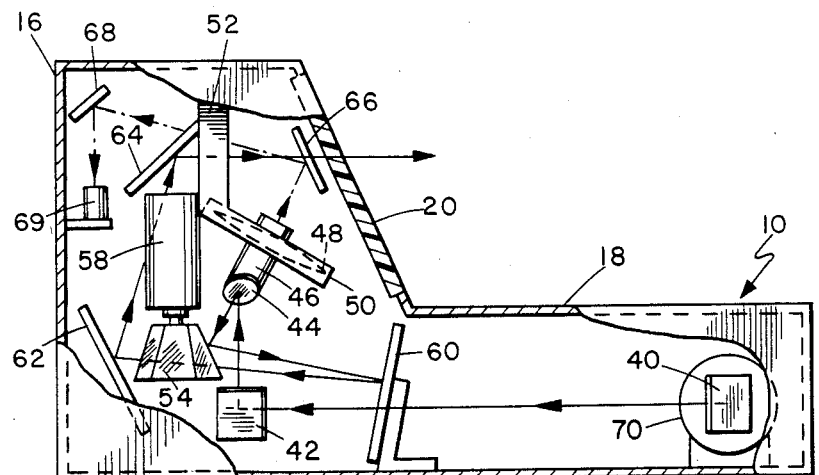
FIG. 3 is a side elevation view of the bar code scanner, with portions cut away and showing the mirrors of a single optical path.

FIG. 3 is a side elevation view of the scanner interior showing one exemplary scan line path. The light utilized is typically a beam of coherent light generated by laser (not shown) which is transmitted through a negative lens, an attenuator and a positive lens (all not shown), all located beneath top surface 18 in the forward section base portion 14. The focused beam of light is reflected by mirror 40 to the rear section of base portion 14 below window portion 16. The beam is then reflected by mirror 42 upwardly and inwardly towards mirror 44 which is mounted on the bottom of mounting post 46. Post 46 is mounted so as to extend through the center of circular lens 48. Lens 48 is retained within lens retainer 50 which encircles the edge of lens 48. Lens retainer 50 is mounted at one edge to support bracket 52 which is coupled at another end to the top panel of window portions 16.

Light reflects off of mirror 44 from mirror 42 to the reflecting surfaces of polygon-shaped spinner 54. Spinner 54 is coupled by shaft 56 to motor 58 which causes spinner 54 to rotate at a predetermined speed, for example, 3600 revolutions per minute. The light reflecting off of mirror 44 approaches spinner 54 at approximately a 30 degree angle with respect to the common axis of the mirrored surfaces on spinner 54 defined by shaft 56.

The light beam reflects off of spinner 54 which as it rotates forms a scan line which is reflected horizontally towards primary mirror 60. Primary mirror 60 reflects the scan line in an opposite direction towards secondary mirror 62 which is positioned near the rear panel of base portion 14. Secondary mirror 62 reflects the scan line upwardly towards terciary mirror 64 which reflects the scan line, which for this example, as a horizontal scan line through window section 20.

Figure 4:
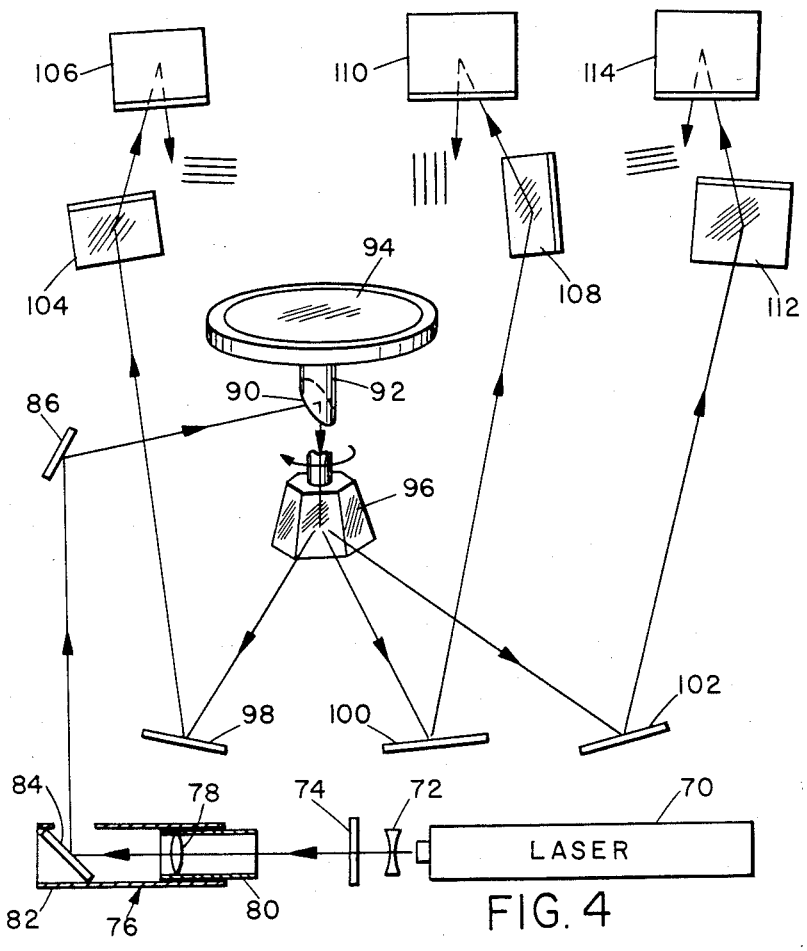
FIG. 4 is a schematical illustration of the laser scanning system including the optical path.

FIG. 4 schematically illustrates the optical path of the beam to the three sets of mirrors per spinner surface sweep which causes a scan line in each of the scanned patterns 30, 32 and 34. In FIG. 4, laser 70, typically a helium neon laser, generates a beam of coherent light which is passed through negative lens 72 which expands the beam. The expanded beam is then coupled through attenuator 74 which reduces optical power in the beam. The reduced power optical beam is coupled into assembly 76 which contains therein positive lens 78 mounted within tube 80. Tube 80 is slideably mounted within tube 82. Tube 82 has mounted therein at the end opposite tube 80 mirror 84. Mirror 84 is mounted at a 45 degree angle so as to reflect the beam passing through positive lens 78 out of an opening in tube 82 rearwardly towards mirror 86. Mirrors 84 and 86 respectively correspond to mirrors 40 and 42 in FIG. 3. Tube 80 is slideably mounted within tube 82 to permit the movement of lens 78 in the beam path so as to permit focus adjustment of the beam.

The focused beam reflected off of mirror 84 to mirror 86 is directed towards mirror 90 mounted at an angle on the bottom of mounting post 92 which is mounted through the center of lens 94. The beam is reflected off of mirror 90 towards the surfaces of polygon-shaped spinner 96.

Spinner 96 is typically a six-sided polygon with each surface being mirrored and each surface being at a different angle with respect to 30 degrees from the common axis through spinner 96. Typically the spinner mirrors are angled at increments of 0.7 degrees from the normal 30 degree angle previously defined. As spinner 96 rotates in the direction as illustrated by the arrow, the beam is reflected respectively across the faces of primary mirrors 98, 100 and 102. The beam as reflected across primary mirror 98 forms a scan line which is reflected across the face of secondary mirror 104. The scan line reflected off mirror 104 is further reflected across the face of terciary mirror 106 which results in a tilted horizontal scan line exiting through window section 20.

Similarly, the beam is reflected across the face of primary mirror 100 which forms a scan line which is reflected towards secondary mirror 108. The scan line reflected across the face of mirror 108 is then reflected by mirror 108 across the face of terciary mirror 110 which reflects the vertical scan line through window section 22.

Similarly, the beam reflected off of the face of primary mirror 102 forms a scan line which is reflected across the face of secondary mirror 112 which further reflects the beam across the face of terciary mirror 114. Mirror 114 reflects the tilted horizontal scan line through window section 22.

Figure 5:
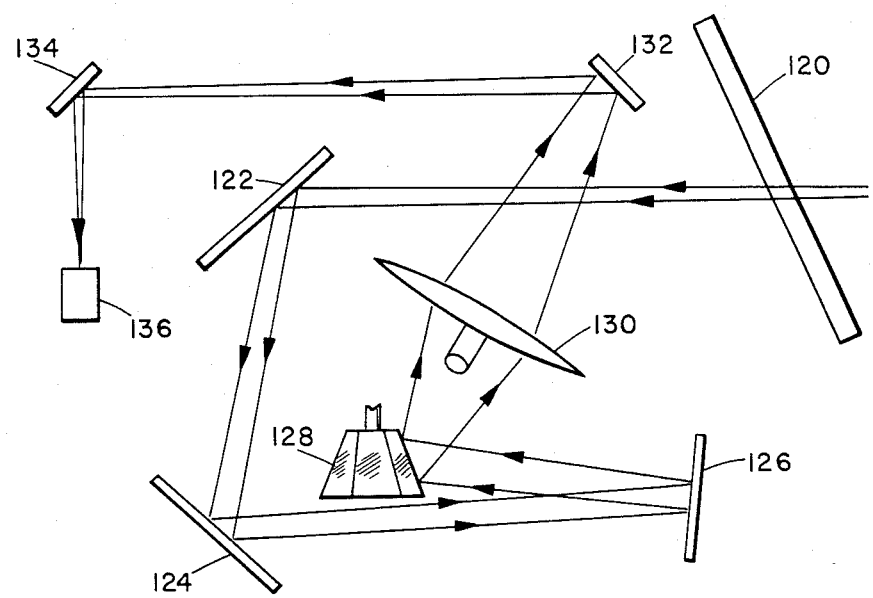
FIG. 5 is a schematical illustration of the detection of a return signal in a single optical path.

It is preferred that the mirrors utilized in the present invention all be front surfaced mirrors to avoid distortion of the beam when reflected. It should be further noted that due to the fact that the scan lines from a single apparent source are separated from each other such that only a single scan line in that pattern can enter a viewers eye placed in any position in front of the pattern such that the effective average power received by the eye is reduced by a factor of 6 thus reducing the power to a safe level preventing eye damage as established by regulatory limits. This permits the elimination of a tank circuit which had previously been used to control the operation time of the laser. FIG. 5 schematically illustrates the detection of a return signal in a single optical path of a scan line. The scan line returns along the same optical path to the polygon as which it followed from the polygon exiting out through the window. The scan line is reflected off of the object being scanned through a portion of window 120 back through terciary mirror 122. The return scan line is reflected off of mirror 122 to secondary mirror 124. Secondary mirror 124 reflects the scan line back to primary mirror 126. Primary mirror 126 reflects the scan line back across the surface of spinner 128. The return scan line is reflected upwardly through lens 130 where it is focused upon the front surface of collecting mirror 132. Mirror 132 reflects the focused return optical signal to the rear portion of the window section of the scanner housing. The return optical signal reflected off of collecting mirror 132 is directed towards collecting mirror 134 which directs the optical signal into detector 136. Collecting mirrors 132 and 134 along with detector 136 respectively correspond to collecting mirrors 66 and 68 and detector 69 of FIG. 3.

Detector 136 converts the optical signal into an electrical signal which is used by the electronics (not part of this invention) to convert the return signal into electrical signals which correspond to the detected signal. The detected signal converted into an electrical signal by detector 136 is correlated by the electronics with a previously stored known bar code value for identifying the scanned item.

Figure 6:
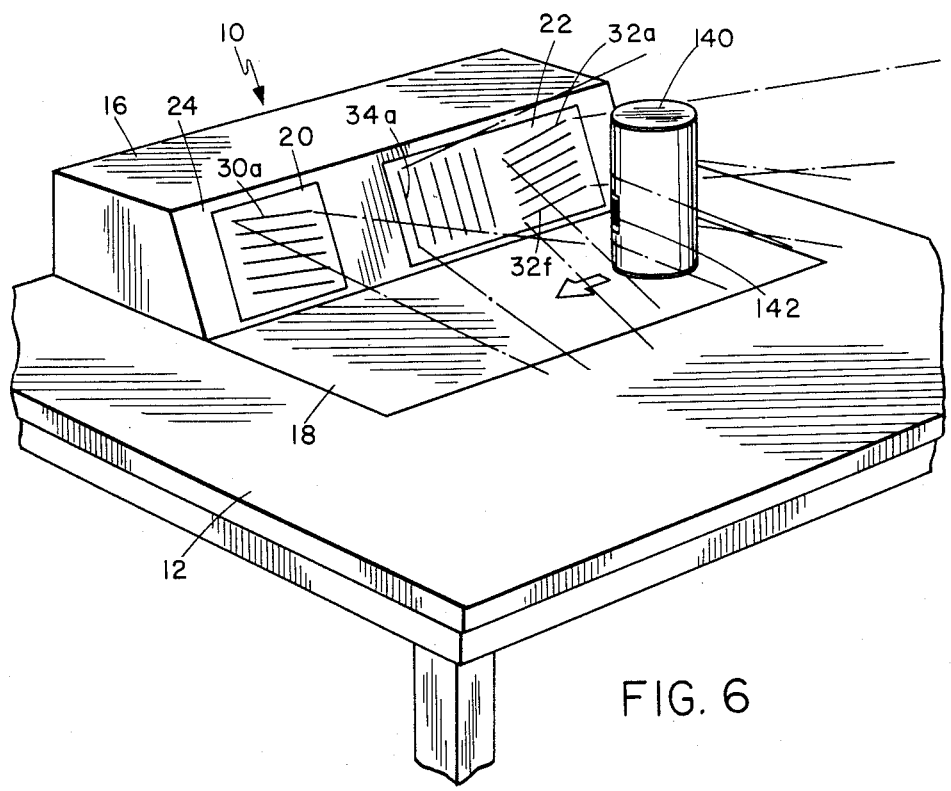
FIG. 6 illustrates an object being scanned by a countertop mounted bar code scanner.

FIG. 6 illustrates an object being scanned by a countertop mounted scanner 10 as it moves through the scanning region adjacent window portion 24 and above top surface 18. As the object moves along the countertop 12 into the scanning region, in the direction indicated by the arrow, the object first encounters the scan pattern 32. As illustrated in FIG. 6 the scan lines of the scan pattern 32, with scan lines 32a and 32f being indicated by the broken lines, "wrap around" object 140. It is likely that the bar code 140 affixed to object 142 would be detected by one of these scan lines intermediate of scan lines 32a and 32f. The scan pattern 32 is tilted such that as the object is moved through the scanning region the scanning pattern scan lines effectively scan down the side of object 142. The scan lines at the edge first entering the scanning region permit scanning to occur higher up on the object than when moved further into the region whereas scanning occurs further down on the can. It should be noted that the scan lines 30a–30f and 32a–32f exit from the window sections in an upwardly tilted plane with respect to the plane of top surface 18.

For bar codes which are placed horizontally on the object, scan pattern 34 is used for the detection. As the object is moved through the scanning region and into the planes designed by scan lines 34a–34f, the object bar code would be detected by this pattern. For exemplary purposes, the plane defined by scan line 34a illustrated by the broken lines.

As the object 140 is moved through the scanning region a second set of horizontal scanned lines exits window portion 16 through window section 20. These additional scan lines are included in the event that the tilted horizontal scan lines of scan pattern 32 fail to detect the vertically oriented bar code on object 140. Scan line 30a is indicated by the dashed lines and defines a plane which wraps around the object 140 as it passes through the scan line planes. The scan pattern 30 is indicated with scan lines tilted upwardly as the object moves through the scan pattern in the direction indicated by the arrow. The tilt in the scan lines permit these scan patterns to essentially scan from a lower portion of the object to a higher portion of the object.

It should be further noted that the vertical scanning beam allows a ±45 degree rotation of a can (with respect to the horizontal bar code centered directly facing the front of the window sections) with bar code detection still achievable. With a horizontal scanning beam there is only approximately a ±25 degree rotation of a can before vertical bar detection is not achieved. The use of two horizontal scanning beams permits the detection of vertical bar codes with a ±45 degree rotation.

Utilization of the side scanning technique as disclosed in the present invention is compatible with the marking techniques employed by manufacturer of consumer products. Typically the product manufacturer will affix the bar code to the side of the package rather than the bottom. In the event that the bar code is fixed to the bottom, the product can readily be turned 45 degrees from vertical such that the scanner will detect the code. The scanner typically permits scanning in a range of 0 to 6 inches from the window sections. The angles at which the scan patterns 30 and 32 are tilted across the scanning region from the horizontal is typically 15 degrees. The scan lines of scan patterns 30 and 32 extend upwardly and outwardly through the scanning region from the window. The compact nature of the scanner permits countertop mounting with the typical thickness from the top surface 18 to the bottom of the housing of base portion 14 to be approximately 2.6 inches. The height of the scanner unit from the bottom of the base portion 14 to the top of window portion 16 is typically 6.5 inches. The angle from the perpendicular to top surface 18 is in the range of 0–40 degrees.

The previous description of the preferred embodiments are provided to enable any person skilled in the art to make or use the present invention. Various modification to these embodiments will be readily apparent to those skilled in the art, and the generic principals designed herein may be applied to other embodiments without the use of the inventive faculty. Thus, the present invention is not intended to be limited to the embodiment shown herein, but is to be accorded the widest scope consistent with the principals and novel features disclosed herein.

What is claimed is:

1. An apparatus for scanning a bar code affixed to an object and providing an electrical signal indicative of the scanned bar code, comprising:
   a housing having a base portion and a window portion, said window portion mounted above a rear section of said base portion with the forward section of said base portion having a flat top surface, said window portion having an optically transmissive window mounted in a side facing said top surface, the region above said top surface and adjacent said window defining a scanning region;

means mounted within said housing for generating first, second and third scan patterns each comprised of a plurality of substantially parallel spaced apart light scan lines, wherein said first scan pattern scan lines each entering across said scanning region through said window at planes each at a first predetermined angle from planes parallel to said top surface, said third scan pattern scan lines each entering across said scanning region through said window at planes each at second predetermined angle from planes parallel to said top surface, said second scan pattern scan lines each entering said scanning region through said window at planes each substantially perpendicular to the plane of said top surface, said second scan pattern scan lines oriented along said window for entering said scanning region between said first and third scan pattern scan lines;

means for detecting light reflected from the bar code affixed to an object being scanned within said scanner region, back through said window, said reflected light having at least a predetermined intensity, and said means for detecting light providing an electrical signal in response thereto; and means for directing said reflected light from a bar code affixed to an object within said scanning region to said means for detecting light.

2. The apparatus of claim 1 wherein said first and third predetermined angles are respectively in the range of 10 degrees to 35 degrees so as to converge inwardly and downwardly with respect to said top surface.

3. The apparatus of claim 2 wherein said first and third scan pattern scan lines enter said scanning region upwardly and outwardly from said window at a predetermined angle from planes parallel to the plane of said top surface.

4. A compact, low-profile, side scanning bar code scanner comprising:

a housing having a base portion and a window portion, said window portion mounted above a rear section of said base portion with the forward section of said base portion having a flat top surface, said window portion having an optically transmissive window mounted in a side facing said top surface, the region above said top surface and adjacent said window defining a scanning region;

means for generating a coherent beam of light mounted within said housing;

a polygon-shaped spinner mounted within said housing, said spinner having a plurality of reflecting surfaces thereon, each surface positioned about a different angle with respect to a common axis;

means mounted within said housing for rotating said spinner at a predetermined rotation rate;

means mounted within said housing for direction said beam of light to each reflective surface of said spinner, one at a time as said spinner is rotated;

first reflecting means mounted within said housing for generating in response to said beam of light reflecting from said spinner a first scan pattern including a plurality of substantially parallel spaced apart light scan lines;

second reflecting means mounted within said housing for generating in response to said beam of light reflecting from said spinner a second scan pattern including a plurality of substantially parallel spaced apart light scan lines;

third reflecting means mounted within said housing for generating in response to said beam of light reflecting from said spinner a third scan pattern including a plurality of substantially parallel spaced apart light scan lines;

wherein said first scan pattern scan lines each entering said scanning region through said window at planes each at a first predetermined angle from planes parallel to said top surface, said third scan pattern scan lines each entering said scanning region through said window at planes each at second predetermined angle from planes parallel to said top surface, said second scan pattern scan lines each entering said scanning region through said window at planes each substantially perpendicular to the plane of said top surface, said second scan pattern scan lines oriented along said window for entering said scanning region between said first and third scan pattern scan lines;

means for detecting light reflected from the bar code affixed to an object being scanned within said scanner region, back through said window, said reflected light having at least a predetermined intensity, and said means for detecting light providing an electrical signal in response thereto; and means for directing said reflected light from a bar code affixed to an object within said scanning region to said means for detecting light.

5. The scanner of claim 4 wherein said first and third predetermined angles are respectively in the range of 10 degrees to 35 degrees so as to converge inwardly and downwardly with respect to said top surface.

6. The scanner of claim 5 wherein said first and third scan pattern scan lines enter said scanning region upwardly and outwardly from said window at a predetermined angle from planes parallel to the plane of said top surface.

7. The scanner of claim 4 wherein said means for generating a coherent beam of light comprises:

a laser mounted in said forward section of said base;

a negative lens mounted adjacent the light output of said laser within said forward section;

an optical attenuator mounted adjacent said negative lens within said forward section;

a positive lens mounted within an inner holder, said inner holder slidably mounted within and at one end of an outer holder mounted within said forward section;

a mirror mounted at the other end of said outer holder, said outer holder having a hole in a side facing the rearward section of said base;

wherein said laser, said negative lens, said optical attenuator, said positive lens and said mirror are optically aligned.

8. The scanner of claim 4 wherein said means for rotating is a motor coupled to a bracket mounted to a top panel of said window portion and having a downwardly extending shaft having said spinner mounted thereon.

9. The scanner of claim 4 wherein each surface of said spinner reflects said beam of light respectively through said first, second and third reflecting means, with each surface of said spinner generating a predetermined scan line of each of said first, second and third scan patterns.

10. The scanner of claim 4 wherein said first reflecting means comprises:

a primary mirror mounted in said rearward section of said base facing said spinner;

a secondary mirror mounted in said rearward section adjacent of said base adjacent a rear panel;

a terciary mirror mounted in said window portion; and wherein said beam of light is reflected from said spinner across the face of said primary mirror, said primary mirror reflecting said beam of light across the face of said secondary mirror, said secondary mirror reflecting said beam of light across the face of said terciary mirror and said terciary mirror reflecting said beam of light through said window as scan lines in said first scan pattern.

11. The scanner of claim 4 wherein said second reflecting means comprises:

a primary mirror mounted in said rearward section of said base facing said spinner;

a secondary mirror mounted said rearward section adjacent of said base adjacent a rear panel;

a terciary mirror mounted in said window portion; and wherein said beam of light is reflected from said spinner across the face of said primary mirror, said primary mirror reflecting said beam of light across the face of said secondary mirror, said secondary mirror reflecting said beam of light across the face of said terciary mirror and said terciary mirror reflecting said beam of light through said window as scan lines in said second scan pattern.

12. The scanner of claim 4 wherein said third reflecting means comprises:

a primary mirror mounted in said rearward section of said base facing said spinner;

a secondary mirror mounted said rearward section adjacent of said base adjacent a rear panel;

a terciary mirror mounted in said window portion; and wherein said beam of light is reflected from said spinner across the face of said primary mirror, said primary mirror reflecting said beam of light across the face of said secondary mirror, said secondary mirror reflecting said beam of light across the face of said terciary mirror and said terciary mirror reflecting said beam of light through said window as scan lines in said third scan pattern.

* * * * *